United States Patent [19]

Barcza et al.

[11] Patent Number: 5,328,098
[45] Date of Patent: Jul. 12, 1994

[54] THRUST VECTORING EJECTOR NOZZLE

[75] Inventors: W. Kevin Barcza, Stuart; Larry E. Anders, West Palm Beach, both of Fla.

[73] Assignee: United Technologies Corporation, Hartford, Conn.

[21] Appl. No.: 89,351

[22] Filed: Jul. 9, 1993

[51] Int. Cl.⁵ .............................................. F02K 1/02
[52] U.S. Cl. ........................... 239/265.35; 239/265.39; 60/230
[58] Field of Search .............. 239/265.41, 265.39, 239/265.37, 265.35, 265.33, 265.19; 60/232, 230, 228

[56] References Cited

U.S. PATENT DOCUMENTS

| 3,004,385 | 10/1961 | Spears, Jr. et al. | 239/265.41 |
| 3,214,904 | 11/1965 | Bailey et al. | 239/265.41 X |
| 3,214,905 | 11/1965 | Beavers et al. | 239/265.41 X |
| 3,367,579 | 2/1968 | Mehr | 239/265.41 |
| 3,612,400 | 10/1971 | Johnson et al. | 239/265.19 |
| 3,954,225 | 5/1976 | Camboulives et al. | 239/265.41 |
| 4,994,660 | 2/1991 | Hauer | 60/232 X |
| 5,082,182 | 1/1992 | Bruchez, Jr. et al. | 239/265.35 |
| 5,140,809 | 9/1992 | Taylor | 239/265.19 X |
| 5,235,808 | 8/1993 | Taylor | 239/265.19 X |

FOREIGN PATENT DOCUMENTS 455401 of 0000 Switzerland ................... 239/265.41

Primary Examiner—Andres Kashnikow
Assistant Examiner—Lesley D. Morris
Attorney, Agent, or Firm—Edward L. Kochey, Jr.

[57] ABSTRACT

The external flaps (32), which contain the ram air, continue to form a conical structure during vectoring. External flaps (32) are hinged to the unison ring (30) with ejector flaps (34) hinged to the external flaps. A scissors linkage (48) joins each ejector flap (34) to the adjacent external flops. A spaced slider connection (58) guides, from the ejector flaps (34), the divergent flaps (26) which are joined to the convergent flaps (20) with a universal joint (28).

8 Claims, 6 Drawing Sheets

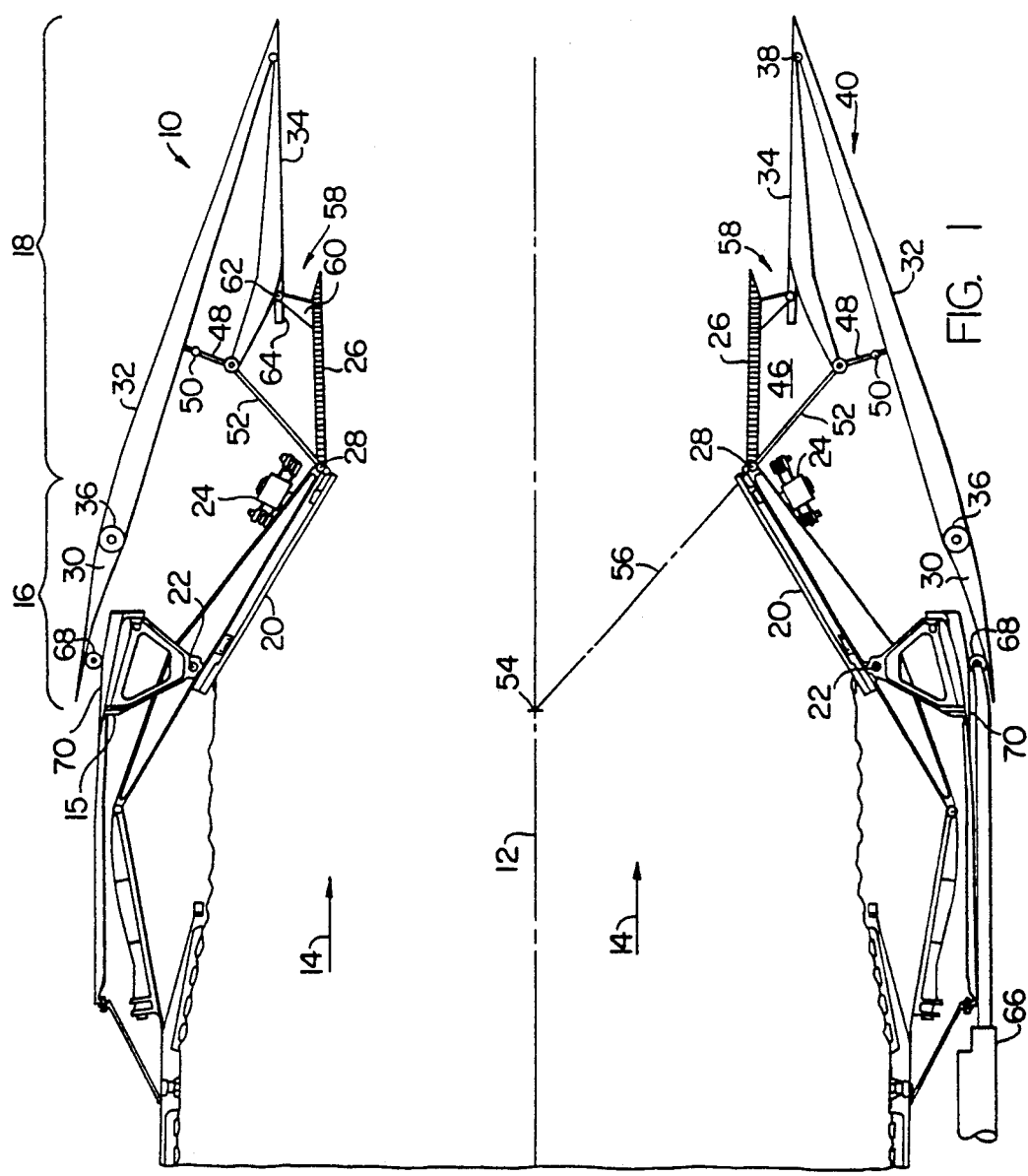

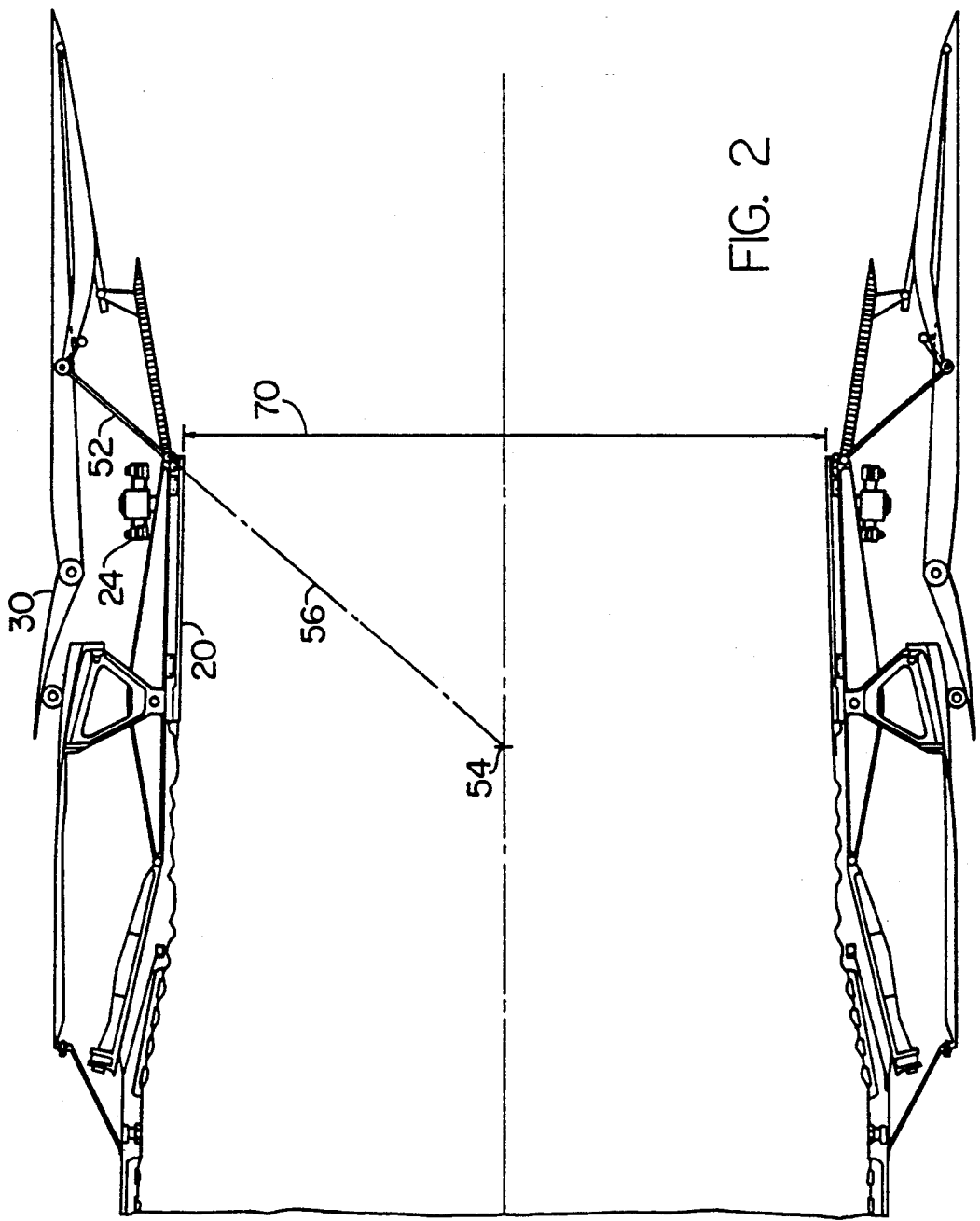

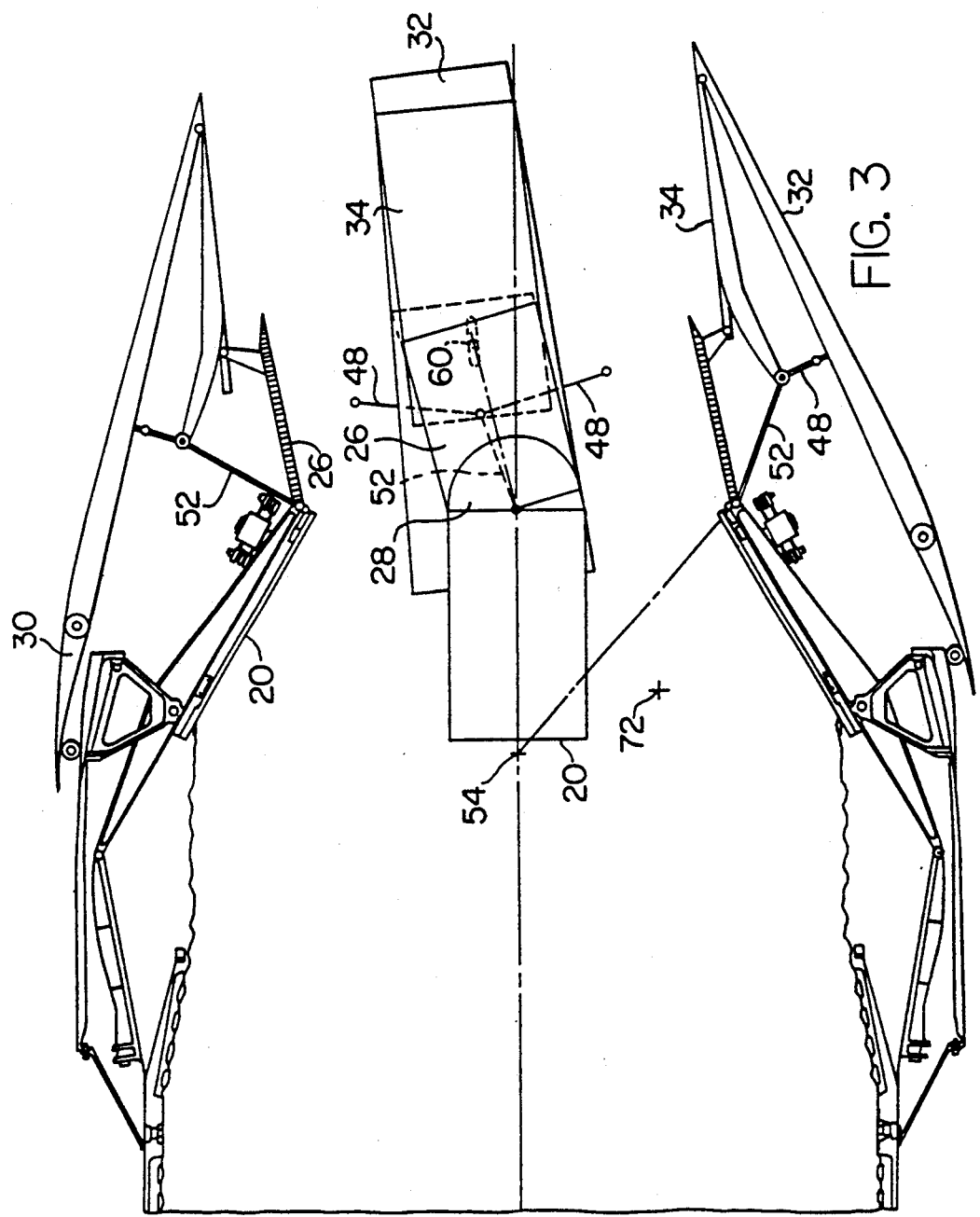

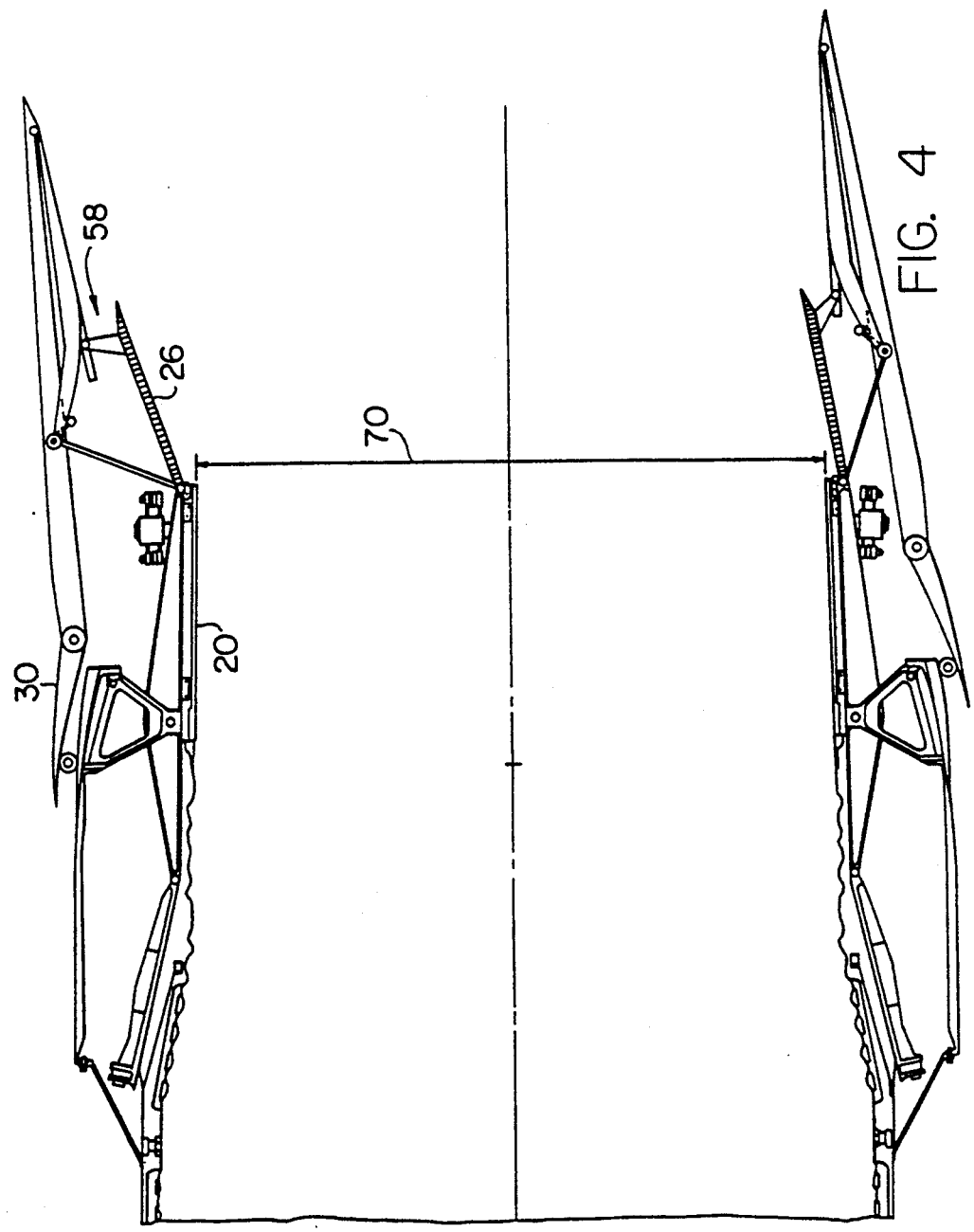

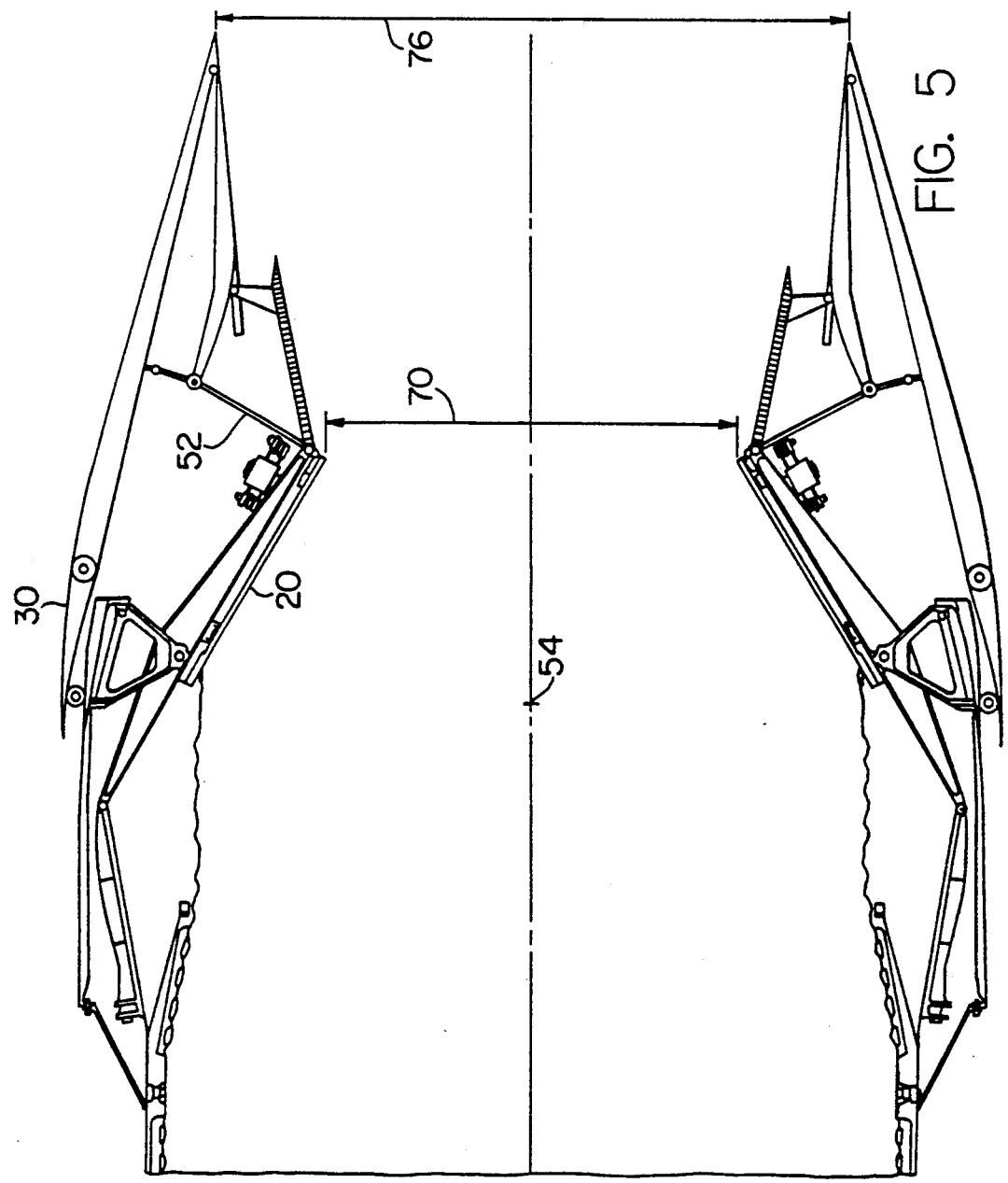

THRUST VECTORING EJECTOR NOZZLE

TECHNICAL FIELD

The invention relates to exhaust nozzles for aircraft gas turbine engines and in particular to an axisymmetric nozzle with cooling air ejection.

BACKGROUND OF THE INVENTION

Cooling air is frequently used to cool the materials of the exhaust nozzles of gas turbine engines. Frequently, fan air is used where considerable pressure is available to direct and modulate the cooling air flow.

In engines with high fan pressure ratios the cooling air is extensively compressed and therefore has an elevated temperature. Accordingly, it is difficult to achieve adequate cooling with this higher temperature air.

It is known therefor to design the nozzle as an ejector whereby cooling air can be induced at or beyond the throat plane. Ambient air enters the ram duct and is induced from there into the nozzle, adjacent the surfaces. It can be appreciated that very little excess pressure is available with this arrangement.

When axisymmetric nozzles are used requiring pitch and yaw, appropriate flow becomes more tenuous. The external flaps which confine the ram air can skew and become difficult to seal. Ram air can then leak out, rather than passing into the nozzle flow.

SUMMARY OF THE INVENTION

It is an object of the invention to maintain a conical structure of the external flaps whereby seal and containment of the ram air is simplified, despite the skewed structure experienced by the divergent flaps under vectoring operation.

The conventional plurality of variable throat convergent flaps of an axisymmetric nozzle are connected at the aft end to divergent flaps. These are connected with universal joints permitting thrust vectoring of the divergent flaps.

A unison ring is disposed concentrically with the convergent flaps and a plurality of external flaps are hinged to the unison ring, whereby rotation around a hinge pin only is possible. A plurality of ejector flaps are hinged in a similar manner to the aft end of the plurality of external flaps, extending forward therefrom.

A scissors link formed of two links is connected to the forward end of each ejector flap, and each link is secured to an adjacent external flap. A spaced slider connection exists between each divergent flap and a corresponding ejector flap which maintains the spacing by transmitting force normal to the surfaces of the two flaps but permitting axial sliding.

A support link connects the forward end of each ejector flap and the aft end of each convergent flap. Preferably, the imaginary extension of these support links passes through a center point around which the unison ring rotates.

BRIEF DESCRIPTION OF THE DRAWINGS

FIG. 1 is a side section of the nozzle at minimum throat diameter;

FIG. 2 is a side section of the nozzle at maximum throat diameter;

FIG. 3 is a side section of the nozzle at the minimum throat and vectored, and also showing a radial view of the flaps.

FIG. 4 is the side section of the nozzle at maximum throat and vectored;

FIG. 5 is a side section of the nozzle at an extremely high pressure ratio;

DESCRIPTION OF THE PREFERRED EMBODIMENT

Figure 6A:
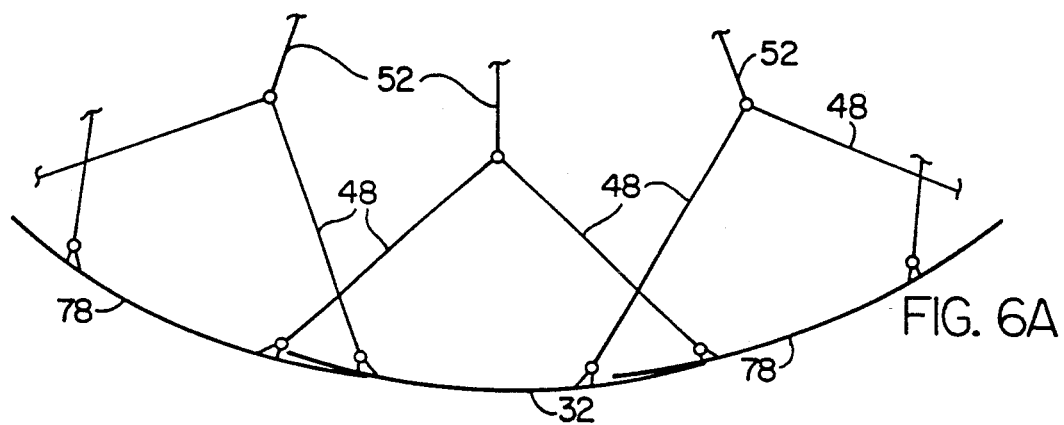
FIG. 6A and B show positions of the scissors link at maximum and minimum throat area.

Ejector nozzle 10 shown in FIG. 1 has a centerline 12 and exhaust gasses 14 passing therethrough. The nozzle has a forward static structure 15, a convergent section 16 and a divergent section 18.

Convergent flaps 20 are of the balanced beam type pivoting around a bearing 22 and being moved by actuator linkage 24 to a desired position.

Divergent flaps 26 are connected at their forward end to the aft end of convergent flaps 20 by a universal joint 28. Thus, divergent flap 26 is capable of rotation not only around the axis of the joint 28 but also in the circumferential direction. An appropriate connection of this type is shown in U.S. patent application Ser. No. 07/914,289, now U.S. Pat. No. 5,215,256.

An ejector shroud assembly is formed of a unison ring 30, a plurality of external flaps 32 and a like plurality of ejector flaps 34. Connection 36 between the unison ring 30 and the external flap 32 is a hinge connection capable only of rotation around the axis of the pin of the connection 36. Connection 38 between the external flap 32 and the ejector flap 34 is also a hinge connection. It can therefore been seen that based on the unison ring 30 and the centerline thereof, this entire ejector shroud assembly 40 will remain conical and not skew despite any thrust vectoring operation. Therefore, sealing between adjacent external flaps 32 can be more effectively accomplished, thereby retaining the maximum ram air within chamber 42.

Ambient air enters as ram air through a duct into chamber 42, thereafter passing through opening 46 between divergent flap 26 and ejector flap 34. This air cools the outside of divergent flap 26 and surface cools the hot side of ejector flaps 34.

A scissors link 48 is secured to the forward end of ejector flap 34 and connected to external flaps at point 50 on the two external flaps adjacent the shown external flap 32. This scissor linkage also forms a portion of the ejector shroud assembly which remains conical.

The shroud assembly as described above remains conical regardless of its degree of opening but it is statically indeterminent. Its position is determined by support link 52 connected between the aft end of the convergent flap 20 and the upstream end of ejector flap 34. Centerpoint 54 is a point on the centerline of the nozzle and substantially axially aligned or slightly upstream of unison ring 30. The point is also located substantially at the forward end of the unison ring track. It is this point about which the unison ring rotates during vectoring operation. Insofar as possible, an imaginary extension 56 of support link 52 extends through the centerline in the normal unvectored conditions. This includes the minimum throat area position shown in FIG. 1 and the maximum flow area position shown in FIG. 2. This is not the case for the extremely high area ratio condition of FIG.

5. Such extreme pressure ratio is used only during super cruise operation at which time vectoring is not required.

The structure locating the position of divergent flap 26 remains to be described. A spaced slider connection 58 is comprised of a posted member 60 having an end 62 of a T- or mushroom-shape, fitting within slot 64 of the ejector flap 34. This is capable of transferring radial forces and circumferential forces, but is free to slide axially.

Positioning of the unison ring 30 is accomplished by actuator 66 operating between the static structure 14 and the unison ring 30. Roller 68 which is a portion of the unison ring 30 operates on track 70 with the unison ring being capable of rotation around centerpoint 54 as well as translation axially. In FIG. 2 the unison ring 30 remains in substantially the same condition while actuator linkage 24 has moved the convergent flaps 20 to a position of maximum throat area 70. Support links 52 continue to have the imaginary extension 56 substantially passing through centerpoint 54 of the nozzle.

In FIG. 3 the unison ring 30 has been rotated around centerpoint 54 in the counterclock direction as viewed in FIG. 3. This causes the nozzle to vector upwardly to achieve pitch control. Viewing the illustration as a plan view rather than a side elevation, it can be seen that this same structure also satisfies yaw requirements.

If one were to visualize the support links 52 of FIG. 1 as disconnected, from universal joint 28, the whole conical structure including these links would rotate about point 54. It would follow that the links 52 would still have an imaginary extension passing through point 54. However, since this is not possible some rotation of the links is required to achieve the operating condition. The links 52 must be moved from the original condition to the condition where they extend through a revised centerpoint 72. This amount of rotation is approximately the same for all the links, thus maintaining concentricity of the shroud assembly.

The flaps shown in FIGS. 1, 2, 4, and 5 as well as the flaps discussed above in FIG. 3 are all moving in the direction radial to the nozzle during the illustrated vectoring movement. FIG. 3 also shows flaps which are located on the side of the nozzle which accordingly move in a substantially circumferential direction during vectoring. Convergent flap 20 has at its aft end universal joint 28 by which it is secured to divergent flap 26. Under the influence of the post 60 engaging ejector flap 34, the divergent flap 26 is moved to its skewed condition.

The unison ring 30 along with the external flap 32, the ejector flap 34 and the scissors 48 retain their conical shape. The support link 52 skews to the vectoring location, and therefore this link must have a spherical bearing joint at each end.

In FIG. 4 the unison ring 30 is in a position similar to that of FIG. 3, but convergent flaps 20 are located with the maximum throat area 70. It can be seen that the nozzle is vectored upwardly and that the ejector openings 58 are maintained.

In FIG. 5 the convergent flaps 20 are positioned for a small throat area 70. Unison ring 30 is translated to a forward position whereby an extremely large exit flow area exists at exit location 76. This high area ratio is used only for the super cruise condition. Even though unvectored, the extension of support link 52 does not pass through center point 54. This condition is not included or a nominal unvectored condition. However, since vectoring from this operating condition is not required, this is not a problem.

FIG. 6 shows the position of the support link and scissors links at various throat openings. Referring to FIG. 6A, with a nozzle closed condition it can be seen that support link 52 connects to scissors link 48 which are connected to external flaps 78 which are adjacent the inline external flap 32.

Figure 6B:
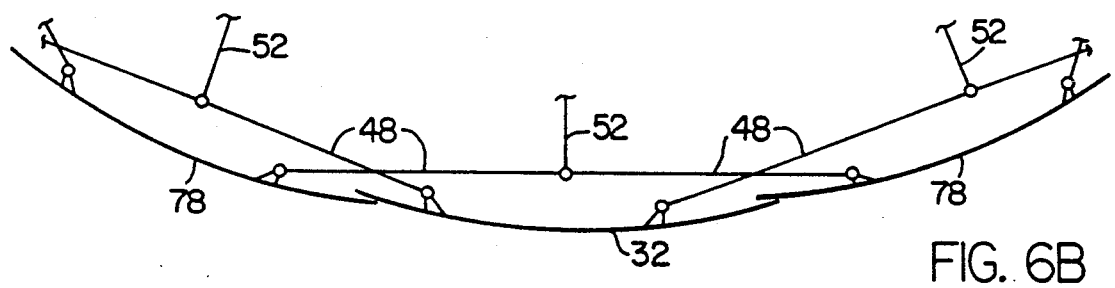

In FIG. 6B a nozzle open position is shown again with support link 52 convecting to the scissors link 48 which are secured to the external flaps 78.

Figure 7:
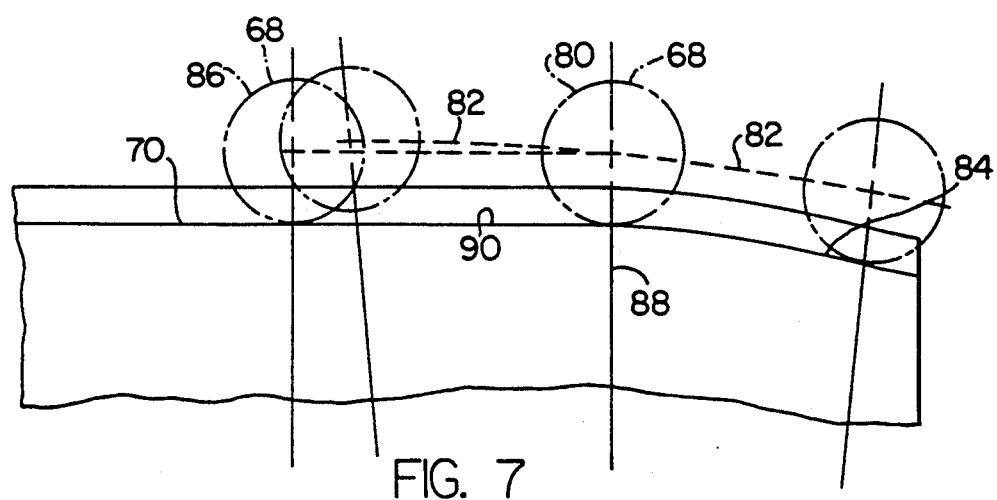
FIG. 7 is a side section showing the unison ring track shape.

In FIG. 7, track 70 is shown in conjunction with various positions of the roller 68 of the unison ring 30. Position 80 is the nominal position of the ring. Vectoring of the nozzle requires rotation of the ring around centerline 54 which would therefore move the ring with centerline of the roller passing along arc 82. Track surface 84 is consistent with this. However, in order to achieve the high area ratio of FIG. 5, the ring is translated forward with roller 68 moving to position 86. The portion of the track 70 forward of the nominal position 88 therefore can no longer follow the arc 82 but it must be linear as illustrated by track portion 90.

We claim:

1. An axisymmetric thrust vectoring ejector nozzle comprising:
   a plurality of convergent flaps, each flap disposed adjacent to other convergent flaps;
   a plurality of divergent flaps;
   a universal joint connecting each divergent flap to the aft end of a convergent flap;
   a unison ring disposed coaxially with said plurality of convergent flaps;
   a plurality of external flaps hinged to said unison ring;
   a plurality of ejector flaps, each having the aft end hinged to the aft end of one of said plurality of external flaps;
   a scissors linkage from the forward end of each ejector flap to each adjacent external flap;
   a spaced slider connection between each of said divergent flaps and a corresponding ejector flap; and
   a plurality of support links, each support link connecting the forward end of each said ejector flap and the aft end of each said convergent flap.

2. An apparatus as in claim 1 further comprising:
   said unison ring supported on tracks permitting axial translation and also rotation around a center point located on the axial center line of said plurality of convergent flaps.

3. An apparatus as in claim 2 wherein:
   said center point is also located axially at substantially the forward end of said tracks.

4. An apparatus as in claim 2 further comprising:
   the imaginary extension of said support link extending substantially through said center point when said nozzle is in a nominal unvectored condition.

5. An apparatus as in claim 4 further comprising:
   said spaced slider connection comprising a posted member on said divergent flap, and a slot in said ejector flap receiving said posted member.

6. An apparatus as in claim 1, further comprising:
   a spherical bearing at each end of each support link.

7. An apparatus as in claim 5, further comprising:
   a spherical bearing at each end of each support link.

8. An apparatus as in claim 7 wherein:
   said center point is also located axially at substantially the forward end of said tracks.

* * * * *